United States Patent [19]

Kinoshita

[11] Patent Number: 4,479,048
[45] Date of Patent: Oct. 23, 1984

[54] RECLAIMING MACHINE FOR SCRAPS OF EXPANDED FOAM THERMOPLASTIC MATERIAL

[76] Inventor: Tomoo Kinoshita, 26-9-203, 4-chome, Kameari, Katsushikaku, Tokyo, Japan

[21] Appl. No.: 474,127

[22] Filed: Mar. 10, 1983

[30] Foreign Application Priority Data

Mar. 10, 1982 [JP] Japan ............................. 57-32671[U]

[51] Int. Cl.³ .............................................. F27B 9/06
[52] U.S. Cl. ..................................... 219/388; 165/87;
209/913; 222/146.1; 219/421; 366/83; 366/146
[58] Field of Search ............... 209/913; 219/214, 388,
219/421, 530, 424; 221/150 HC, 150 A;
222/146 HE; 414/197; 165/87, 84; 257/86;
126/343.5 A; 366/83, 146, 150; 425/549

[56] References Cited

U.S. PATENT DOCUMENTS

| | | | |
|---|---|---|---|
| 2,731,241 | 1/1956 | Christian | 165/87 |
| 2,989,289 | 6/1961 | Christian | 165/87 |
| 3,055,053 | 9/1962 | Livingston et al. | 165/87 X |
| 3,263,748 | 8/1966 | Jemal et al. | 165/87 X |
| 3,274,647 | 9/1966 | Andouart | 219/214 X |
| 3,299,473 | 1/1967 | Rorer et al. | 219/214 X |

FOREIGN PATENT DOCUMENTS 889657 2/1962 United Kingdom ................. 165/87

*Primary Examiner*—Volodymyr Y. Mayewsky
*Attorney, Agent, or Firm*—Oblon, Fisher, Spivak, McClelland & Maier

[57] ABSTRACT

A reclaiming machine for scraps of expanded foam thermoplastic material including an electrical source, a housing having a first and second material feeding poet formed therein, a first and second cylinder positioned within the housing and in communication with the first and second port, respectively, a first and second threaded screw shaft rotatably mounted in the first and second cylinder, respectively, wherein the thread diameter of the first and second screw shafts increase in a direction away from the first and second port, respectively, a mechanism operatively associated with the first and second shafts for selectively driving the first and second shafts; a third cylinder positioned between the first and second cylinder and forming a discharging port located adjacent the first and second material feeding port, first and second tubes interconnecting the first and second cylinders to the third cylinder at an end thereof opposite the first and second port; and band heaters enclosing an external wall of the first, second and third cylinders, each of the band heaters being separately connected to the electrical source.

6 Claims, 4 Drawing Figures

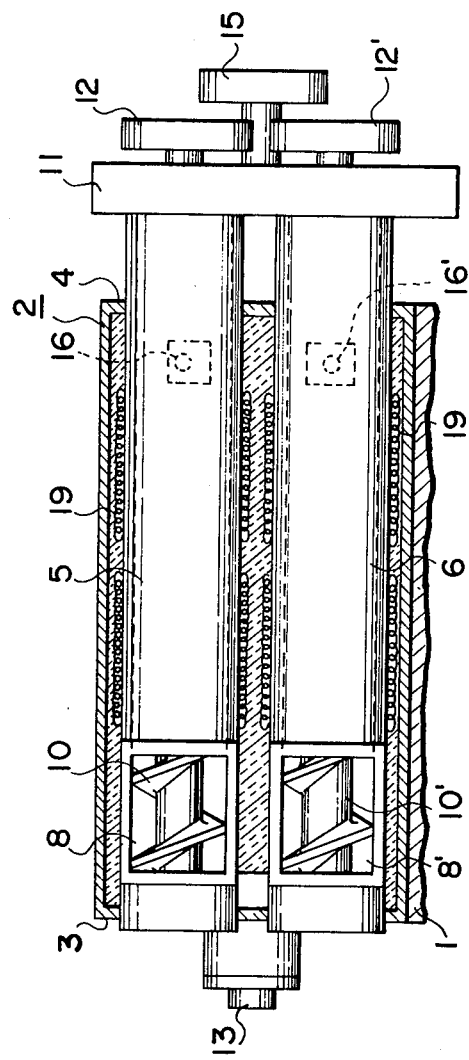
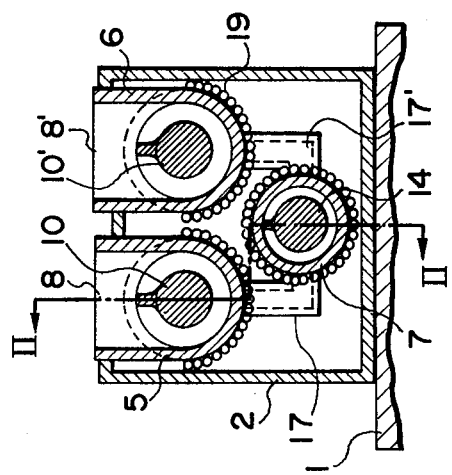
FIG. 1
FIG. 3

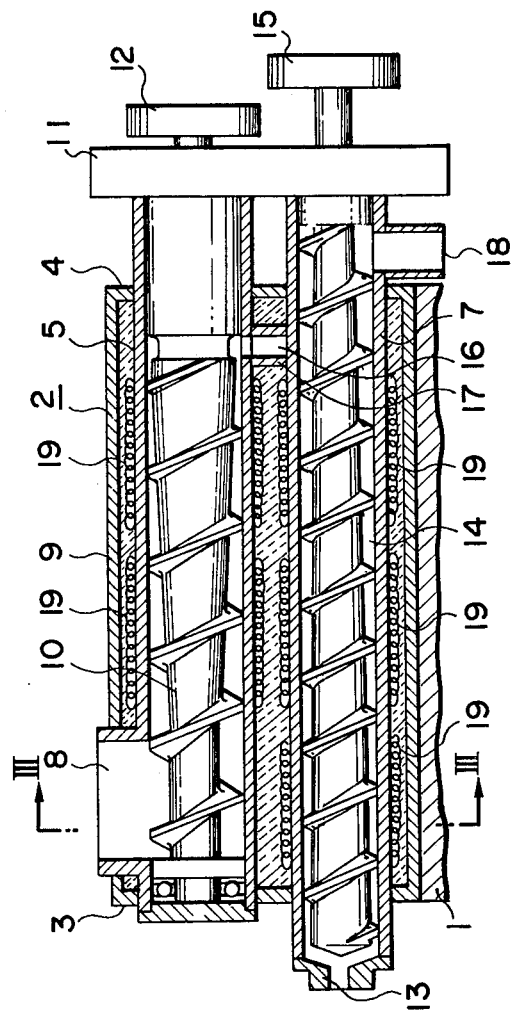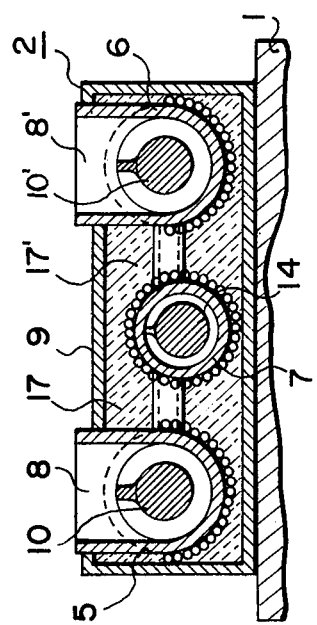

RECLAIMING MACHINE FOR SCRAPS OF EXPANDED FOAM THERMOPLASTIC MATERIAL

BACKGROUND OF THE INVENTION

1. Field of the Invention

This invention relates to a reclaiming machine for scraps of expanded foam thermoplastic material.

2. Description of the Prior Art

Cutting scraps are generated in the process of manufacturing of insulating material or cases, etc., or are generated by punching completed items, especially foam products of thermoplastic synthetic resin material such as polysytrene, polyethylene, etc., having a high expansion rate of 15 to 70 times and having a variety of apparent specific weights, or volumes in accordance with differences of specific weight of the material yielded or the difference in the types of the products.

In order to reclaim scraps having characteristics as above stated, the inventor of this invention has previously proposed, by Japanese utility model application No. 47-148518 (Jitsu-Ko-Sho No. 56-2585), a machine with two cylinders in which scraps of expanded foam are to be reciprocated. This invention was very effective for reclaiming, however, the amount of generated expanded foam scrap often varies, and when the material is excessive, it is required to utilize a large capacity storage tank at a midpoint thereof. Also, if the machine is prepared to match a large amount of material, it will result in the continual operation of a large machine, and excessive energy will therefore be utilized. Furthermore, the heat radiation from the melting portion is undesirably large.

SUMMARY OF THE INVENTION

In consideration of the above deficiencies, the object of the present invention is to provide a reclaiming machine for scraps of expanded foam thermoplastic material by adopting three rows of cylinders, and is devised to respond to the variation of the amount of scraps generated by driving two rows of extruders separately and which is also to prevent heat radiation from the melting portion.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 is a partly cut-away plan view of the first exemplary embodiment;

FIG. 2 is a front sectional view taken along the line II—II;

FIG. 3 is a sectional side view taken along the line III—III; and

FIG. 4 is a longitudinal sectional side view of the second exemplary embodiment.

DETAILED DESCRIPTION OF THE PREFERRED EMBODIMENTS

Now, the structure of the invention is explained by way of an exemplary embodiment shown in FIGS. 1-4 illustrating a hollow test insulating housing or case 2 with a rectangular section and that is set on the base 1.

A first cylinder 5 and second cylinder 6 are parallely positioned a predetermined space from each other, such that they pass through the upper parts of opposite side walls 3, 4 of the heat insulating case 2. Also, a third cylinder 7 is installed between the first and second cylinders 5, 6 and at a slightly lower level, so that such projects through both side walls 3, 4.

The first and the second cylinders 5, 6 have their material feeding ports 8, 8' respectively opened to the upper portion of the side wall 3 through the upper wall 9 of the insulation case 2. In the interior of the first and the second cylinders 5, 6 are installed screw shafts 10, 10' which have identical external thread diameters through their length wherein the diameter of the threaded bottom increases gradually from the ends of material feeding ports 8, 8' to the opposite ends, each resting on bearings, and the shafts 10, 10' are disposed so as to be driven in a clockwise direction by driving the pulleys 12, 12' positioned at an end of the insulating case 2 opposite the ends housing the material feeding ports 8, 8' side, through reduction gears (not shown) in the reduction gear box 11. Although driving sources (for example electric motors) for each shaft are to be separately installed, such have not been specifically illustrated.

Further, a discharging port 13 for the third cylinder 7 is located below the material feeding ports 8, 8' and within the interior of cylinder 7 is positioned a screw shaft 14 which has a uniform external threaded diameter, and the inner diameter increases gradually in the direction of discharge side 13. The screw shaft 14 is mounted on bearings, and the end of shaft 14 is made to be rotated in a counterclockwise direction by a pulley 15 through the reduction gear box 11. The driving source of the pulley 15 is not indicated in the drawings, however, a driving source with a change gear can be used.

Further, communicating with the underside of the first and the second cylinders 5, 6, and opposite the position of the material feeding ports 8, 8', material flow ports 16, 16' are provided and are in communication with the sides of the third cylinder 7 and are formed by connecting pipes 17, 17'. A vent 18 is opened from the underside of the third cylinder 7 and at a position adjacent the reduction gear box 11 and between the connecting pipes 17, 17' and gear box 11. Furthermore, a plurality of band heaters 19, 19, 19 are installed to cover exterior walls of the first, second and third cylinders 5, 6 and 7 for heating them.

Due to the above-noted structure of the exemplary embodiment, when a large amount of material scraps accumulate, after the cylinders are heated to the predetermined temperature by way of electric current applied to each band heater 19, 19, 19, screw shafts 10, 10' are driven in the clockwise direction by driving the pulleys 12, 12' separately. Then when finely crushed material scraps (hereinafter called material) are fed through material feeding ports 8, 8', the material is forced into the interior of the first and second cylinders 5, 6 by screw shafts 10, 10', and its volume 15 gradually decreased during its transfer through the first and second cylinders 5, 6, in accordance with changes in diameter of the screw shafts 10, 10' and the material heated by the band heaters 19, 19, 19 along the external surface of the first and second cylinders 5, 6 reaches a half-melted condition. Then, the half-melted material is formed into the connecting pipes 17, 17', then discharged into the third cylinder 7, and transferred to the discharging port 13 by means of the screw shaft 14 which is rotated by the driving pulley 15 at a certain speed corresponding to the amount of material being fed, and then pushed out through the discharging port 13 deaerating foam mingled in the material. On the other hand, gas generated by defoaming moves along the back pressure flow surface of the screw in the opposite direction to material movement and is exhausted to the exterior through vent 18.

When the material scrap feed is of a small quantity, either one of the first and second cylinders 5, 6 is disconnected from its driving source and the band heaters 19, 19, 19, and melting is performed by using only one or the other of the cylinders, and by way of the same operation as stated above.

Now, the second embodiment of the present invention is explained in accordance with FIG. 4 as follows: this exemplary embodiment serves to transfer the height dimension position of the third cylinder 7 so as to be nearer to the first and second cylinders 5, 6, and to connect the first and second cylinders 5, 6 with the third cylinder 7 by connecting pipes 17, 17', which are of simple horizontal configuration. Except as explained, this example is identical with the first exemplary embodiment, therefore further explanation is omitted by using the same symbols in FIG. 4. The second exemplary embodiment has the advantage of allowing a reduction of the total height of the reclaiming machine.

Because the invention has the structure and function as explained in the above-noted exemplary embodiment, the invention allows the use of both the first and second cylinders 5, 6 when the material fed is of large quantity, and the driving of only one of the other of the first and second cylinders 5, 6 when material fed is of a small quantity, serving to save energy as well as requiring no provision for equipment for storing materials. Also, as the materials move through the U-shaped passage, the whole floor area requirement for the installation becomes smaller.

Further, because the first, second and third cylinders 5, 6, 7 are installed in one heat insulated case 2, even when one of the first and second cylinders 5, 6 is stopped in operation by reason of a small amount of material being fed, that cylinder is kept warm due to heating of the other cylinder by the band heaters, 19, 19, 19 which makes warming-up time of the nonoperating cylinder shorter.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reclaiming machine for scraps of expanded foam thermoplastic material comprising:
    an electric source;
    a housing having a first and second material feeding port formed therein;
    a first and second heat conductive cylinder positioned in the said housing and in connection with said first and second port, respectively;
    a first and second threaded screw shaft rotatably mounted in said first and second cylinder, respectively, wherein the thread diameter of said first and second screw shafts increases in a direction away from said first and second port, respectively,
    a third heat conductive cylinder located between said first and second cylinder and having a discharging port formed therein located adjacent the first and second material feeding port;
    a third threaded screw shaft rotatably mounted in said third cylinder;
    first and second tubes interconnecting said first and second cylinders to said third cylinder at an end thereof opposite said first and second port;
    means operatively associated with said first, second and third shaft for selectively driving said first, second and third shaft respectively; and
    a plurality of band heater means enclosing an external wall of the first, second and third cylinders for conducting heat via said cylinders to said thermoplastic material, each of said band heater means being connected to said electrical source.

2. A reclaiming machine as set forth in claim 1, wherein said first and second tubes further comprise horizontally oriented tubes.

3. A reclaiming machine as set forth in claim 1, wherein said third cylinder is positioned substantially midway between and below said first and second cylinders.

4. A reclaiming machine as set forth in claim 1, further comprising vent means formed in said third cylinder.

5. A reclaiming machine as set forth in claim 2, further comprising vent means formed in said third cylinder.

6. A reclaiming machine as set forth in claim 3, further comprising vent means formed in said third cylinder.

* * * * *